(12) United States Patent
Beizer et al.

(10) Patent No.: US 7,447,712 B2
(45) Date of Patent: Nov. 4, 2008

(54) STRUCTURED WORKFOLDER

(75) Inventors: Mordechai M. Beizer, Scarsdale, NY (US); Daniel Berg, Wilton, CT (US); Rand Scullard, New York, NY (US); Pradeep R. Simha, St. James, NY (US); Mark A. Solomon, N. Massapequa, NY (US)

(73) Assignee: Global 360, Inc., Dallas, TX (US)

( * ) Notice: Subject to any disclaimer, the term of this patent is extended or adjusted under 35 U.S.C. 154(b) by 157 days.

(21) Appl. No.: 09/136,244

(22) Filed: Aug. 19, 1998

(65) Prior Publication Data

US 2002/0059325 A1 May 16, 2002

Related U.S. Application Data

(60) Provisional application No. 60/060,225, filed on Sep. 28, 1997.

(51) Int. Cl.
*G06F 7/00* (2006.01)
*G06F 17/00* (2006.01)
*G06F 15/00* (2006.01)

(52) U.S. Cl. .................. 707/203; 707/10; 707/100; 707/104.1; 715/500; 715/511

(58) Field of Classification Search .............. 707/1, 707/5, 10, 100, 104, 200, 206, 500, 522, 707/531, 204, 511, 104.1, 203, 513; 701/29, 701/30; 704/9; 717/3; 709/206; 715/500, 715/511, 513, 522
See application file for complete search history.

(56) References Cited

U.S. PATENT DOCUMENTS

| | | | |
|---|---|---|---|
| 4,953,080 A | 8/1990 | Dysart et al. | 707/103 |
| 4,974,173 A | 11/1990 | Stefik et al. | 345/331 |
| 5,008,853 A | 4/1991 | Bly et al. | 345/331 |
| 5,065,347 A * | 11/1991 | Pajak et al. | 715/835 |
| 5,107,443 A | 4/1992 | Smith et al. | 701/202 |
| 5,115,504 A | 5/1992 | Belove et al. | 707/100 |
| 5,220,657 A | 6/1993 | Bly et al. | 711/152 |
| 5,251,294 A | 10/1993 | Abelow | 707/512 |
| 5,276,835 A | 1/1994 | Mohan et al. | 711/144 |
| 5,280,609 A | 1/1994 | MacPhail | 707/1 |
| 5,339,389 A | 8/1994 | Bates et al. | 345/331 |
| 5,428,729 A | 6/1995 | Chang et al. | 345/331 |
| 5,504,889 A | 4/1996 | Burgess | 707/100 |
| 5,504,890 A | 4/1996 | Sanford | 707/3 |
| 5,506,983 A | 4/1996 | Atkinson et al. | 707/1 |
| 5,530,880 A | 6/1996 | Katsurabayashi | 713/201 |

(Continued)

*Primary Examiner*—Ella Colbert
(74) *Attorney, Agent, or Firm*—Hamilton, Brook, Smith & Reynolds, P.C.

(57) ABSTRACT

A structured WorkFolder for organizing electronic documents in a self-contained data repository comprising sections for grouping related documents, and placeholders for indicating documents expected to be placed in the WorkFolder. The WorkFolder allows users of local or distributed data environments to gather and organize a collection of documents and supporting meta-data in a single data object that can be simultaneously accessed and updated by multiple users. The Work-Folder may also contain one or more task entries that are used to track the progress of work related to a WorkFolder. Additionally, supporting meta-data in the form of tasks, information fields, threaded discussions, as well as a detailed history log of all changes made to the WorkFolder can be stored in the WorkFolder.

57 Claims, 14 Drawing Sheets

U.S. PATENT DOCUMENTS

| | | | |
|---|---|---|---|
| 5,544,360 A | 8/1996 | Lewak et al. | 707/1 |
| 5,551,046 A | 8/1996 | Mohan et al. | 707/8 |
| 5,559,692 A | 9/1996 | Telingator et al. | 705/8 |
| 5,583,993 A | 12/1996 | Foster et al. | 709/205 |
| 5,603,021 A * | 2/1997 | Spencer et al. | 707/4 |
| 5,634,123 A | 5/1997 | Bennion | 707/100 |
| 5,659,734 A | 8/1997 | Tsuruta et al. | 707/8 |
| 5,671,407 A | 9/1997 | Demers et al. | 708/8 |
| 5,692,178 A | 11/1997 | Shaughnessy | 775/453 |
| 5,701,462 A | 12/1997 | Whitney et al. | 707/10 |
| 5,706,452 A | 1/1998 | Ivanov | 345/331 |
| 5,778,381 A * | 7/1998 | Sandifer | 707/104 |
| 5,812,773 A * | 9/1998 | Norin | 709/201 |
| 5,819,295 A * | 10/1998 | Nakagawa et al. | 707/203 |
| 5,835,758 A * | 11/1998 | Nochur et al. | 707/102 |
| 5,857,203 A * | 1/1999 | Kauffman et al. | 707/200 |
| 5,860,066 A * | 1/1999 | Rouse | 705/1 |
| 5,873,103 A * | 2/1999 | Trede et al. | 707/204 |
| 5,899,995 A * | 5/1999 | Millier et al. | 707/102 |
| 5,900,870 A * | 5/1999 | Malone et al. | 715/866 |
| 5,963,940 A * | 10/1999 | Liddy et al. | 707/5 |
| 5,987,506 A * | 11/1999 | Carter et al. | 709/213 |
| 6,006,242 A * | 12/1999 | Poole et al. | 707/531 |
| 6,009,442 A * | 12/1999 | Chen et al. | 707/522 |
| 6,026,388 A * | 2/2000 | Liddy et al. | 707/1 |
| 6,112,024 A * | 8/2000 | Almond et al. | 707/203 |
| 6,148,311 A * | 11/2000 | Wishnie et al. | 345/760 |
| 6,191,786 B1 * | 2/2001 | Eyzaguirre et al. | 345/853 |
| 6,259,444 B1 * | 7/2001 | Palmer et al. | 715/866 |
| 2002/0007373 A1 * | 1/2002 | Blair et al. | 707/505 |

* cited by examiner

FIG. 7

| CONTAINER FOR MANAGING ELECTRONIC DOCUMENTS - PATENT FILING | | | | |
|---|---|---|---|---|
| FILE EDIT VIEW CONTENT FIELD TOOLS HELP | | | | |
| NAME | STATUS | ASSIGNED TO | DEADLINE | COMMENT | LOCATION | TYPE |
| ☐ CLIENT CORRESPONDENCE | | | | |
| 📄 DRAFT APPLICATION | COMPLETED | BILL KING (E-M... | ○10/28/97 | | WINDOWS\DESTO...MICROSOFT WORD |
| ☐ NEW MATTER FORMS | | | | |
| ☐ INVENTION DISCLOSURE | | | ATTATCHED | BITMAP IMAGE |
| ☐ PATENT OFFICE CORRESPONDENCE | | | | |
| 📄 FILED APPLICATION | | | | |
| ☐ OFFICE ACTIONS | | | | |
| ☐ ASSIGNMENT DOCUMENTS | | | | |

148
150

| NAME | STATUS | ASSIGNED TO | DEADLINE | COMMENT |
|---|---|---|---|---|
| ☐ PREPARE APPLICATION | NOT STARTED | | ○10/14/97 | <ENTER INSTRUCTION HERE> | ○MUST BE COMP... |
| ☐ FILE APPLICATION | NOT STARTED | | | MUST BE COMPLETED 30 DAYS AFTER THE TASK NAMED "PREPARE APPLICATION" IS COMPLETED |
| CONFIRM CLIENT APPROVAL OF DRAFT APPLICATION PRIOR TO FILING WITH PATENT OFFICE | | | | |

152    108                                                    8 ○    IN PROGRESS

FIELDS | TASKS | DISCUSSION | HISTORY

FOR HELP PRESS F1

| NAME | STATUS | ASSIGNED TO | DEADLINE | COMMENT | LOCATION | TYPE |
|---|---|---|---|---|---|---|
| ☐ CLIENT CORRESPONDENCE | | | | | | |
| ☐ DRAFT APPLICATION | | | | | ATTATCHED | MICROSOFT WORD D.. |
| ☐ NEW MATTER FORMS | | | | | ATTATCHED | MICROSOFT WORD D.. |
| ✗ CONFLICTING VERSIONS OF THIS ITEM: | | | | | | |
| ▷ ☐ INVENTION DISCLOSURE STARTED | | | | | C:\DEMOS\WORKFOLDER\SO...MICROSOFT WORD D.. | |
| ▷ ☐ INVENTION DISCLOSURE NOT STARTED ☐ | ☐ | | | | C:\DEMOS\WORKFOLDER\SO...MICROSOFT WORD D.. | |
| ☐ PATENT OFFICE CORRESPONDENCE | | | | | | |
| [ ] FILED APPLICATION | | | | | | |
| [ ] ASSIGNMENT DOCUMENTS | | | | | | |
| [ ] OFFICE ACTIONS | | | | | | |
| [ ] AMENDMENTS | | | | | | |
| [ ] NOTICE OF ALLOWANCE | | | | | | |
| ☐ ISSUED PATENT | | | | | HTTP://WWW.USPTO.GOV | INTERNET SHORTCUT |
| ☐ DRAWINGS | | | | | | |
| ☐ DRAWINGS AS FILED | | | | | ATTATCHED | BITMAP IMAGE |
| ☐ AMENDED DRAWINGS | | | | | | |
| ☐ FOREIGN FILINGS | | | | | | |

FIG. 14

STRUCTURED WORKFOLDER

CROSS REFERENCE TO RELATED APPLICATIONS

This application claims priority under 35 U.S.C. § 119 from U.S. Provisional Application Ser. No. 60/060,225 entitled "Structured Workfolder", filed on Sep. 28, 1997, the contents of which are hereby incorporated by reference.

FIELD OF THE INVENTION

This invention relates in general to organizing documents and in particular to a structured WorkFolder for organizing electronic documents.

BACKGROUND OF THE INVENTION

In many business transactions, it is often necessary to assemble a complex set of documents in order to complete the transaction. Folders are a common way of organizing such documents. Some of the documents may be available from inception of the transaction, while others may be received or created as the transaction progresses. Certain documents may need to be available prior to commencing work on various transaction-related tasks. In addition, a number of people may need to work on the transaction simultaneously, all of whom need concurrent access to the transaction information. It is necessary that all the documents relating to a single transaction be tracked, and that none of the documents required for completion of the transaction be missing.

Using a conventional electronic file system, documents may be organized using a hierarchical arrangement of named folders or directories into which other folders or documents may be placed. Typically, the directories are arranged to group documents by common criteria such as subject matter or a customer ID. The documents may then be accessed directly by users with basic tools such as File Manager, a program that allows a user to navigate a directory tree and select a desired document.

A significant drawback to using a hierarchical file system to organize documents is that the transaction folder is not a separate entity, but is tightly linked to the storage hierarchy of the electronic storage device. This precludes distributing the folder to users who may be outside the organization. It also complicates sharing transaction documents among multiple users in situations where all users do not have access to the same electronic storage devices, as in a distributed processing environment. A further drawback is that file system folders are relatively unstructured, making it difficult to ensure process consistency from transaction to transaction.

Several programs provide for shared structured data objects for use in a collaborative environment. For example, Lotus Notes organizes information as "forms", where each form is made up of fields that may be of particular data types such as text, number, time, and rich text. Electronic documents can be attached to a Notes form either as embedded or linked documents. However, Lotus Notes does not provide a mechanism to allow users to specify in advance not only where documents of a specific type are to be stored, but also to identify documents specifically expected to be created in the future. Further, Lotus Notes does not provide for a structure flexible enough for optimally organizing and managing collections of transaction documents.

SUMMARY OF THE INVENTION

It is an object of the invention to provide a data environment where all documents, supporting data, and history related to a unit of work are grouped together.

It is another object of the invention to provide a data environment where all data associated with a unit of work is easily accessible to many different users.

A further object of the invention is to provide a data environment that provides varying degrees of control or guidance related to process management and data flow.

The above and other objects are accomplished by providing a structured WorkFolder for organizing electronic documents comprising sections for grouping related documents, and placeholders for indicating documents expected to be placed in the WorkFolder. The WorkFolder allows users to gather and organize a collection of documents and supporting meta-data in a single data object that can be simultaneously accessed and updated by multiple users.

According to the invention, documents in a WorkFolder may be images, word processing files, spreadsheets, electronic forms, voice, video, or any other type of format. A document may be attached to a WorkFolder and its contents stored within the WorkFolder, or the WorkFolder may be linked to an "external" document via a file system reference, an Open Document Management Application Program Interface (ODMA) link to a document management system, a universal resource locator (URL) address to a Web-based repository, or by any other mechanism that supports links to external data sources.

The WorkFolder may also contain one or more task entries that are used to track the progress of work related to a Work-Folder. Additionally, supporting meta-data in the form of information fields, threaded discussions, as well as a detailed history log of all changes made to the WorkFolder can be stored in the WorkFolder. The WorkFolder provides process-related functionality by keeping track of tasks, including assignments and deadlines, by executing scripted macros either on demand or in response to various events, and by providing for reconciliation of conflicting data updates when more then one user updates the same WorkFolder.

The WorkFolder is implemented as a specialized data object that can be organized, configured, and accessed by the user with the aid of a program user interface as well as by third party applications through the use of an automation interface. The computing environment may be a single computer or many computers connected by one or more networks, including local area networks (LANs), intranets, and the Internet, where the computers are continuously or intermittently interconnected. Preferably, the WorkFolder program is implemented in a conventional operating system such as Microsoft Windows with a user interface based on conventional graphical user interface (GUI) elements and with an automation interface that is based on conventional standards such as object linking and embedding (OLE) Automation or common object model (COM). The WorkFolder data object is stored persistently in such a manner that it can be stored, forwarded, and distributed across a network and be accessed and modified by software running on a variety of different platforms. A preferred persistent representation would be one conforming to widely accepted messaging standards.

BRIEF DESCRIPTION OF THE DRAWINGS

The foregoing and other features of the present invention will be more readily apparent from the following detailed description and drawings of illustrative embodiments of the invention in which:

FIG. 7 is a program screen according to a preferred embodiment of the invention showing the tabs pane with the fields tab selected;

FIG. 8 is a program screen according to a preferred embodiment of the invention showing the tabs pane with the tasks tab selected;

FIG. 10 is a program screen according to a preferred embodiment of the invention showing the tabs pane with the history tab selected;

FIG. 14 is a program screen according to a preferred embodiment of the invention showing conflicting sub-items generated when a conflict requiring mediation occurs but mediation is not performed.

DETAILED DESCRIPTION OF THE INVENTION

Figure 1:
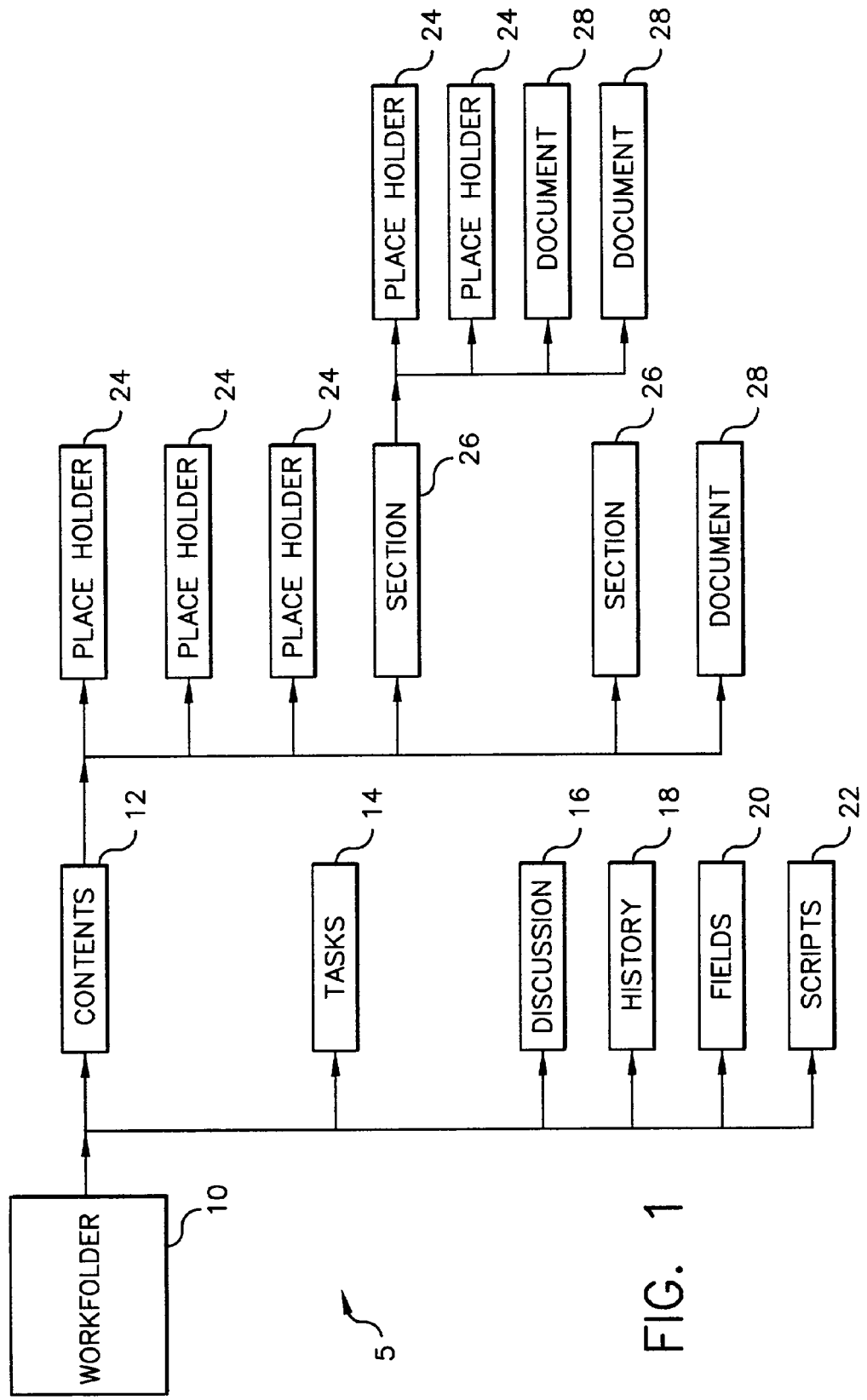
FIG. 1 is an illustrative diagram showing the structural relationship of various data elements in a WorkFolder according to the present invention.

FIG. 1 is an illustrative diagram showing the structural relationship of various data elements in a WorkFolder according to the present invention. In the preferred embodiment, the WorkFolder is configured as a single structured data object 5 and the data elements are connected to each other to form an ordered tree. The root of the tree is the WorkFolder node 10. The WorkFolder node 10 contains a link to a Contents node 12, which in turn is linked to the major portion of the data and structure of the WorkFolder. The WorkFolder node 10 may also contain one or more of a Tasks data element 14, a Discussion data element 16, a History data element 18, a Fields data element 20, and a Scripts data element 22. These elements contain meta-data related to the primary data stored under the Contents node 12. Each of these nodes and elements are discussed below. Because the WorkFolder 10 is organized as a structural data element, objects and nodes can be added, moved, and deleted using conventional programming techniques associated with linked lists, trees, and the like.

The Contents node 12 serves as a base to which structural elements of the WorkFolder 10 are linked. There are three primary elements that may be linked to the Contents node 12: Documents 28, Placeholders 24, and Sections 26. By adding and configuring these elements, a user can form a WorkFolder data object with a structure appropriate for managing and storing documents related to a wide variety of different business transactions.

A Document element 28 is either an attached document or a link to a document that is external to the WorkFolder 10. Because work is accomplished using a variety of document types stored in different locations, the WorkFolder program places no restrictions on document types that can be contained within a WorkFolder, or on the location in which they are stored. In other words, all document files are treated the same by the WorkFolder. Documents 28 may therefore be images, word processing files, spreadsheets, voice or video, or any other type of data format.

When a document is attached to the Contents node 12, a document element 28 is created that contains the document contents as embedded file data. Thus, the document and its contents become a part of the WorkFolder 10. Alternately, a document element 28 can be a link to an external document. The link may be any type of file address that is recognized by the computing environment. Typically supported file addresses include a reference to a document stored in a local or networked file system, an ODMA document identifier for an item stored within a document management system, or a URL address for a web-based intranet or Internet document repository. Other locations may also be supported, depending on the computing platform and its configuration.

When the document is later accessed by the user, the document data is either extracted from the Document element 28 by the WorkFolder program or the document link is passed to the operating system which then retrieves the file from the appropriate storage area. After a document has been extracted or retrieved, the WorkFolder program passes the document to the operating system, which then determines the document type and executes the appropriate application to process the document.

The second major element that can be attached to the Contents node 12, and a primary aspect of the present invention, is a Placeholder 24. A Placeholder 24 is a slot that has been reserved for one or more specific documents not yet created or received. One or more Placeholders 24 can be linked to the Contents node 12 and preferably, the Placeholders 24 are linked to the Contents node 12 as an ordered list. When the WorkFolder is used to organize documents for a given work item, the presence of Placeholders 24 within the WorkFolder indicates to the user that specific documents are expected to be created and stored there.

Figure 2:
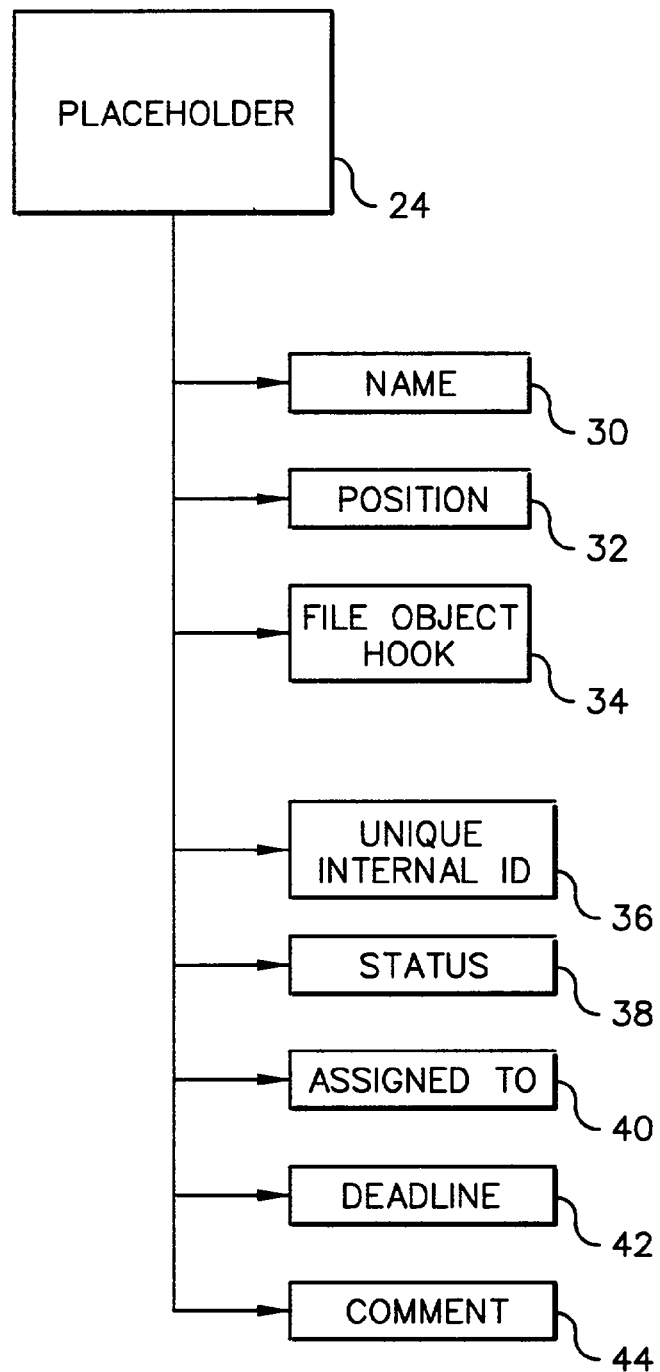
FIG. 2 is a diagram showing the structural and data content of the placeholder data item of FIG. 1.

An illustration of the structure of the Placeholder data element 24 is shown in FIG. 2. Each Placeholder 24 has a Name 30, indicating the data content of the document to be placed in the Placeholder 24, and a File Object hook 34 to which an actual file can later be attached or linked. When placeholders are implemented as an ordered list, a Placeholder 24 may also have a position 32 indicating where in the list that particular Placeholder 24 is located. Further, depending on the programming environment, a Placeholder 24 may have a unique internal identifier 36.

In a preferred embodiment of the present invention, any type of document may fill the File Object hook 34. In an alternative embodiment, a Placeholder 24 may be restricted to a particular file name and/or type designated by the user. A Placeholder 24 is "filled" by attaching a document (embedded or linked) to the File Object hook 34 in a manner similar to adding a document element 28, discussed above. In the preferred embodiment, a Placeholder 24 is reserved for only a single document. However, a Placeholder 24 may be implemented to allow for a collection of documents to be attached, i.e., by adding additional File Object hooks 34 as documents are attached or linked.

A variety of additional data items can also be linked to a Placeholder 24. In the preferred embodiment, a Placeholder 24 contains a Status element 38, which may be used to indicate to the user the status of the document filling placeholder 24. Status 38 includes conditions assigned meanings such as "not started," "in progress," and "complete." A Placeholder may also be assigned to a particular user by storing a unique user ID (such as an e-mail address) in the assignment element 40. In the preferred embodiment, the assignment of a Placeholder 24 to a user generates a program event which then generates and sends e-mail to notify that assigned user about the assignment. In a more preferred embodiment, the notification message contains a link to the specific WorkFolder 10 at issue and information about the assigned placeholder.

A Placeholder 24 can also contain a Comment element 44 which may be used to provide additional free-form information regarding the placeholder. In addition, a Placeholder 24 may contain a Deadline element 42 which indicates a triggering condition and a time period by which the deadline must be satisfied. Deadlines are discussed in more detail in conjunction with Tasks, below.

The third major element that can be attached to the Contents node 12 is a Section element 26. A Section 26 serves as an anchor point for additional Placeholders 24 and Documents 28 and, in an alternate embodiment, may contain further sub-sections. Section elements 26 serve as structural elements that allow contents 12 of the WorkFolder 10 to be organized according to broad categories. Each Section element 26 has a Name that indicates its designated contents. In the preferred embodiment, Documents 28 and Placeholders 24 located within a Section 26 are stored as ordered list elements.

As another aspect of the invention, the WorkFolder 10 has a Tasks data element 14 that contains tasks defining the set of steps required to complete a unit of work, each of which can be assigned to a user and have a deadline. Each task stored within the Tasks data element 14 has a name, which indicates the task to be performed and a status. Preferably, the status is selected from a group that includes the conditions defined to mean "started," "in progress," and "complete."

In addition, each task within the Task data element 14 preferably has attributes that include a task assignee, a comment field, and a deadline. A deadline for a task, as well as a deadline for a placeholder 24, discussed above, can be either an absolute expiration date or a period of time relative to a triggering event. Specifying a relative date indicates that the deadline clock does not start running until the trigger condition has been met. Expiration of a deadline fires an expiration event that can be processed using a conventional Event Handler routine as is known to those of skill in the art. In the preferred embodiment, triggering conditions can be any addition, deletion, or modification of WorkFolder data, including the filling of a placeholder, the completion of a task, the assignment of a task or placeholder, as well as the expiration of a task or placeholder deadline. Event setting and handling are discussed with reference to FIGS. 3a and 3b, below.

In addition to the primary Contents node 12 and the Tasks data element 14, the WorkFolder may also contain several additional meta-data elements. According to one aspect of the invention, a History data element 16 is located within the WorkFolder 10. The History data element 16 contains a log of additions, modifications, and deletions made to any other data element within that WorkFolder 10. The history is generated by the WorkFolder program automatically as changes are made either through the user interface or the automation interface. Preferably, each history entry includes information such as when the change was made, by whom, what type of change was made, as well as the value of the data element before and after the change. Periodically, the WorkFolder may send a copy of the latest history entries to a centralized repository for consolidated reporting. In the preferred embodiment this is done by sending the history via e-mail to a known location whenever the WorkFolder is saved. It should be noted that because the WorkFolder 10 is independent of the software used to create and modify documents stored in or linked by the WorkFolder 10, the history of changes to documents would not generally include details about the substance of changes to documents.

History data can be used to track the evolution of a work item and to derive critical information about the work process. It can also be used as a source to measure and monitor performance, to identify and correct bottlenecks, and to help organizations continuously improve their overall business processes. Preferably, each entry in the history log is keyed to a particular node or data element such as a Placeholder 24, Section 26, or Document 28 and the entries are stored as a single threaded list. Accordingly, the history log may be viewed for the entire WorkFolder 10. Alternately, the history of a single object within the WorkFolder 10, such as a Placeholder 24, may be viewed. In this situation, the WorkFolder program presents a subset of the history log showing only the information related to the desired object.

In the preferred embodiment, the WorkFolder 10 also contains a Fields data element 20 that houses user-definable meta-data relating to one or more properties of a WorkFolder. In the preferred embodiment, the Fields element contains conventional forms processing data elements that are defined with a user interface that allows a user to insert, delete, reorder, and assign various properties to form data elements. Each data element has a name, a data type (such as date, currency, or text string), and may contain an appropriate data value. Preferably, the Fields 20 are defined at the WorkFolder 10 level. However, they may also be defined at lower levels, e.g., within each Section 26, Placeholder 24, or Document 28. As fields are added, edited, and/or deleted, the history log maintained in the History data element 18 is updated accordingly.

According to one aspect of the invention, some or all of the data contents of the Fields data element 20 are exposed to the operating system and through it, to other application programs via standard mechanisms. In the preferred embodiment this is done by representing public data fields as MAPI ("messaging application programming interface") named properties. The specific mechanism utilized depends on the operating environment. Thus, the data stored within the Fields data element 20 can be searched with third party search engines and browsed from outside the WorkFolder program.

According to another aspect of the invention, a Discussion data item 16 is stored within the WorkFolder 10. The Discussion data item 16 provides a location for ongoing communication regarding any number of topics related to the work-in-progress. In the preferred embodiment, comments include a subject identifier describing the subject of the comment text as well as data identifying who wrote the comment and when. For ease of use, comments may be sorted into a conventional threaded discussion tree and processed in a manner similar to discussions maintained by the Internet USENET bulletin board system.

An additional data element, which is preferably linked to the WorkFolder 10, is the Scripts data element 22. According to an aspect of the invention, the WorkFolder program includes a scripting interface that allows the user to extend the functionality of the WorkFolder. The Scripts data element 22 provides a location in which one or more user scripts are embedded within the WorkFolder 10. Each script can be executed on demand and may be written in any scripting language supported by an accessible script engine. Typically supported script languages include VBScript and JavaScript. In one embodiment of the invention, scripts may modify the contents and structure of the WorkFolder itself and also communicate with other application software through an OLE Automation interface. Preferably, the Scripts data element 22 is used in conjunction with an Event Handler. In a preferred embodiment, the Scripts data element 22 contains a master event script which tells what events should be monitored by the Event Handler and which scripts to execute in response to various triggering events. The master event script can contain additional script code or, in its simplest form, is simply a script dispatcher.

Figure 3A:
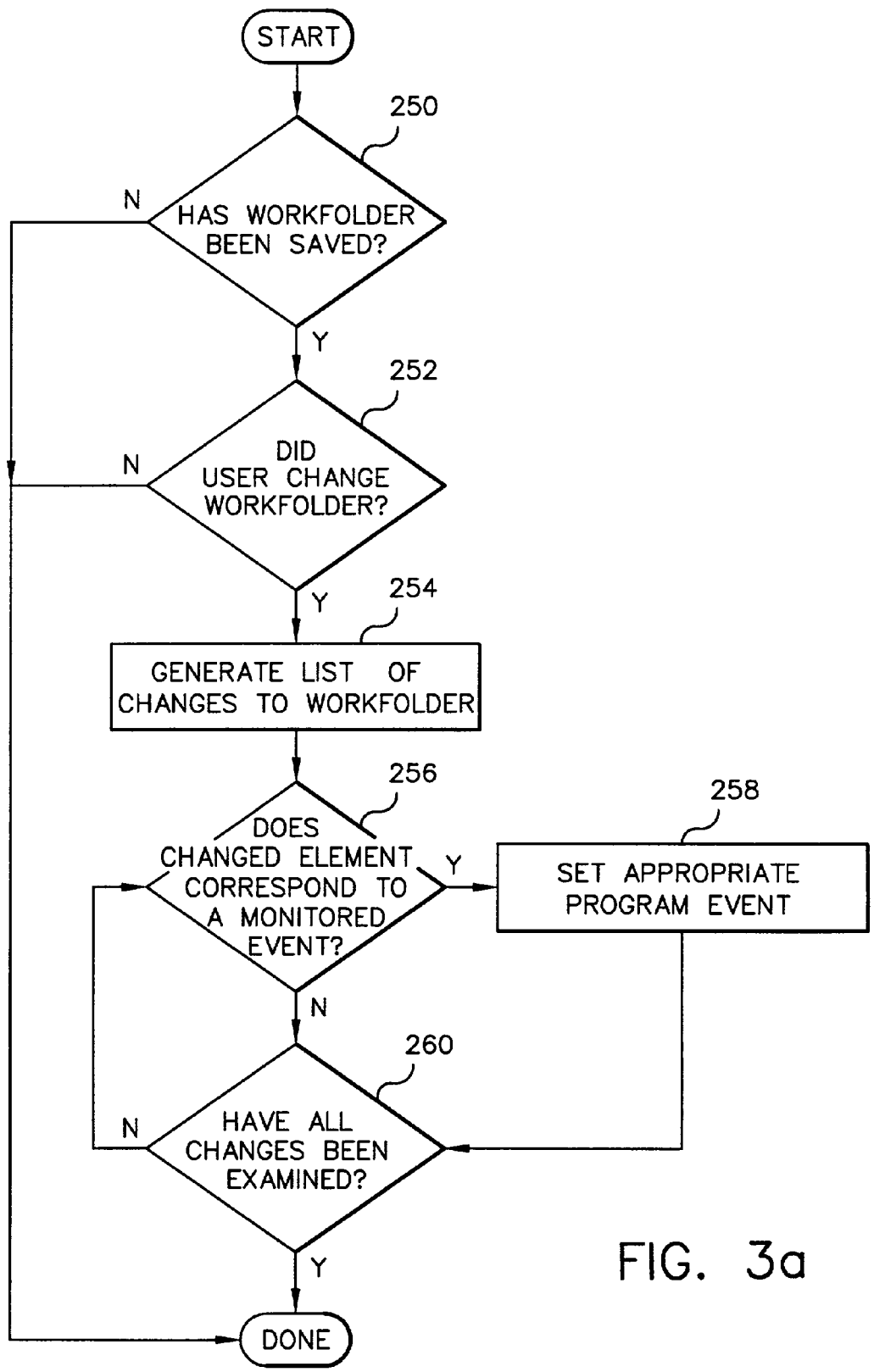
FIGS. 3a and 3b are flowcharts illustrating the generation and processing of events according to one embodiment of the invention.
Figure 3B:
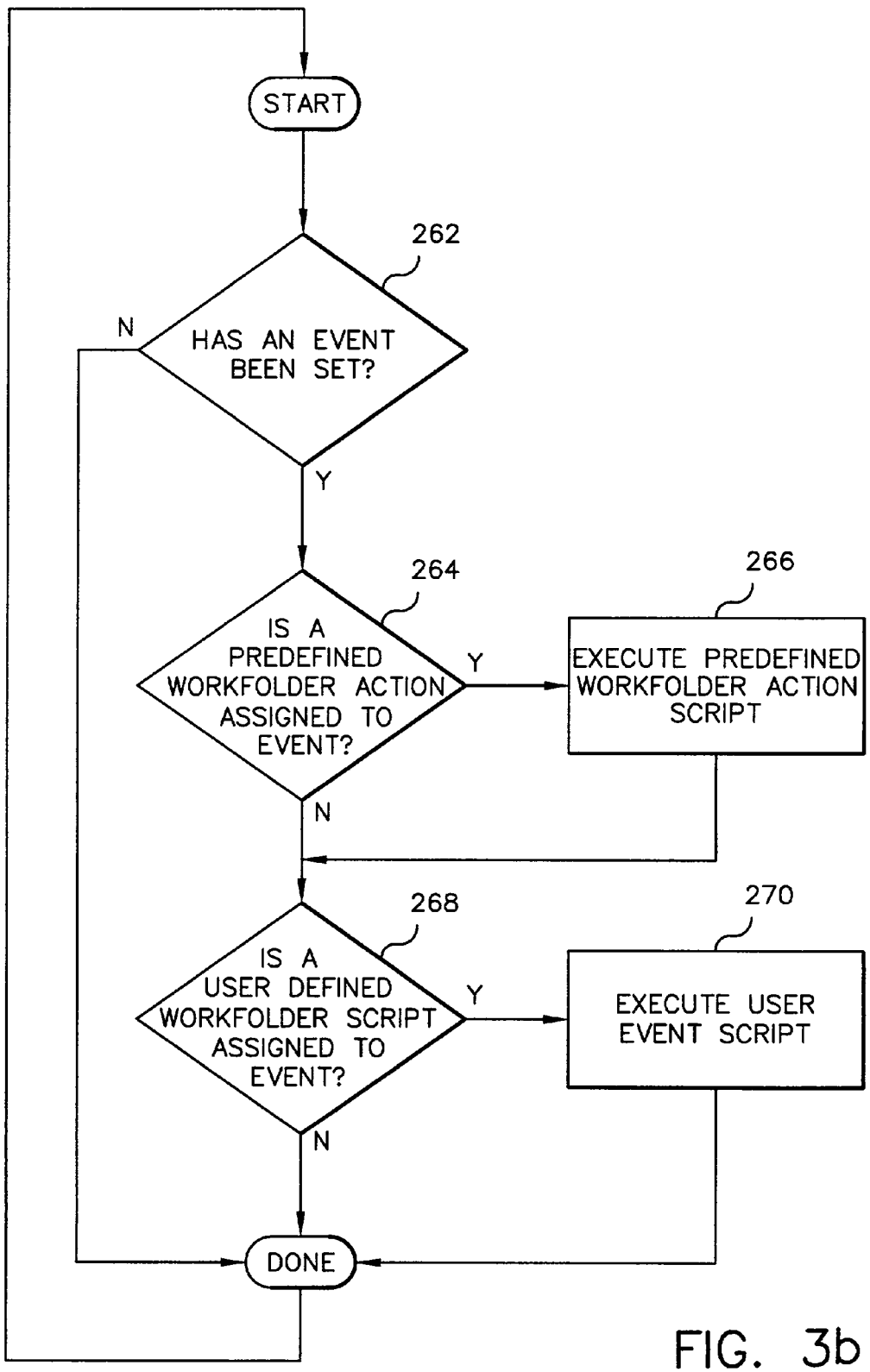

FIGS. 3*a* and 3*b* are flowcharts illustrating the generation and processing of events according to one embodiment of the invention. FIG. 3*a* is a flowchart illustrating the setting of WorkFolder events according to one embodiment of the invention. Preferably, WorkFolder events based on updates to a WorkFolder are initiated only when the WorkFolder is saved. When a WorkFolder is saved (block 250), the WorkFolder program examines the WorkFolder to determine if there have been any changes made. (Block 252). Preferably, this examination is an element-by-element comparison between the WorkFolder to be saved and the WorkFolder which is to be overwritten. If the WorkFolder has been changed, a list of changes is generated (block 254) and each change is inspected to determine if it corresponds to a monitored event (block 256). Monitored events can correspond to any change of a WorkFolder. Typical examples include the assignment of a task and the filling of a placeholder. If a change corresponds to a monitored event, the appropriate Program Event indicator is set to notify the Event Handler which Event has occurred. (Block 258). The examination continues until all changes to the WorkFolder have been examined and all appropriate events have been set. (Block 260). Other WorkFolder events, such as the expiration of a deadline, may be set using a conventional scheduler routine, as is well know to those skilled in the art.

FIG. 3*b* is a flowchart illustrating the monitoring of WorkFolder events according to one embodiment of the invention. Typically, WorkFolder events will be monitored by an Event Handler Routine which continuously checks to see if an event has been set. (Block 262). If an event has been set, the event data is examined to determine if there is a predefined WorkFolder action assigned to that event. (Block 264). If a predefined action has been assigned, the action is executed. (Block 266). A typical predefined action is generating and sending informative e-mail in response to a task assign event. It can be appreciated that unlike user defined Scripts, predefined actions do not need to be specifically included within a WorkFolder. If a predefined action has not been assigned to the event, the Event Handler checks to see if a user defined script has been assigned to the event. (Block 268). If so, the user defined script is extracted from the WorkFolder and executed using the appropriate scripting engine.

According to a further aspect of the invention, once the user has defined a suitable structure and arrangement of placeholder 24, section 26, and document 28 elements in a WorkFolder 10, the WorkFolder 10 can be published as a WorkFolder template. The template preserves the structure of the WorkFolder 10, including the name and ordering of the placeholders 24 and sections 26 in the contents node 12, as well as embedded tasks 14, fields 20, and scripts 22. Preferably, when a WorkFolder is published as a template, the user has the option of retaining or deleting specific data such as embedded or linked files, and field values, as desired. Existing discussion 16 and history 18 data is dropped since it pertains to the specific WorkFolder object 10, and not the newly created template. (A history log related to the template itself will be created if the user proceeds to edit the template as described below). Once a template is created, it may be used to create multiple WorkFolder object instances having the same structure as the template, but addressed to specific work items.

As part of the WorkFolder program initialization data, a basic WorkFolder template is provided which contains the contents node 12 and preferably the Tasks 14, Discussion 16, History 18, Fields 20, and Scripts 22 data elements. The contents node 12 of the basic template contains no predefined Placeholders 24, Sections, 26 or Documents 28 and the data elements 14-22 are empty. This WorkFolder template serves as a starting point from which the user may create a customized WorkFolder by adding placeholder 24, section 26, and document 28 data elements, as well as various tasks 14, scripts 22 and fields 20 as discussed above.

Thus, according to the present invention a WorkFolder 10 is a self-contained data repository of all data related to a specific work item (except for externally linked documents) which is stored and processed as a single data file. The structure of the WorkFolder 10 is defined by specifically ordered Placeholder elements 24, Section elements 26, and Documents 28, all stored under the contents node 12. In the preferred embodiment, the entire WorkFolder is accessible to other programs within the operating environment. The WorkFolder can be manipulated through the WorkFolder user interface, discussed below, or by other programs through an automation interface.

Figure 4:
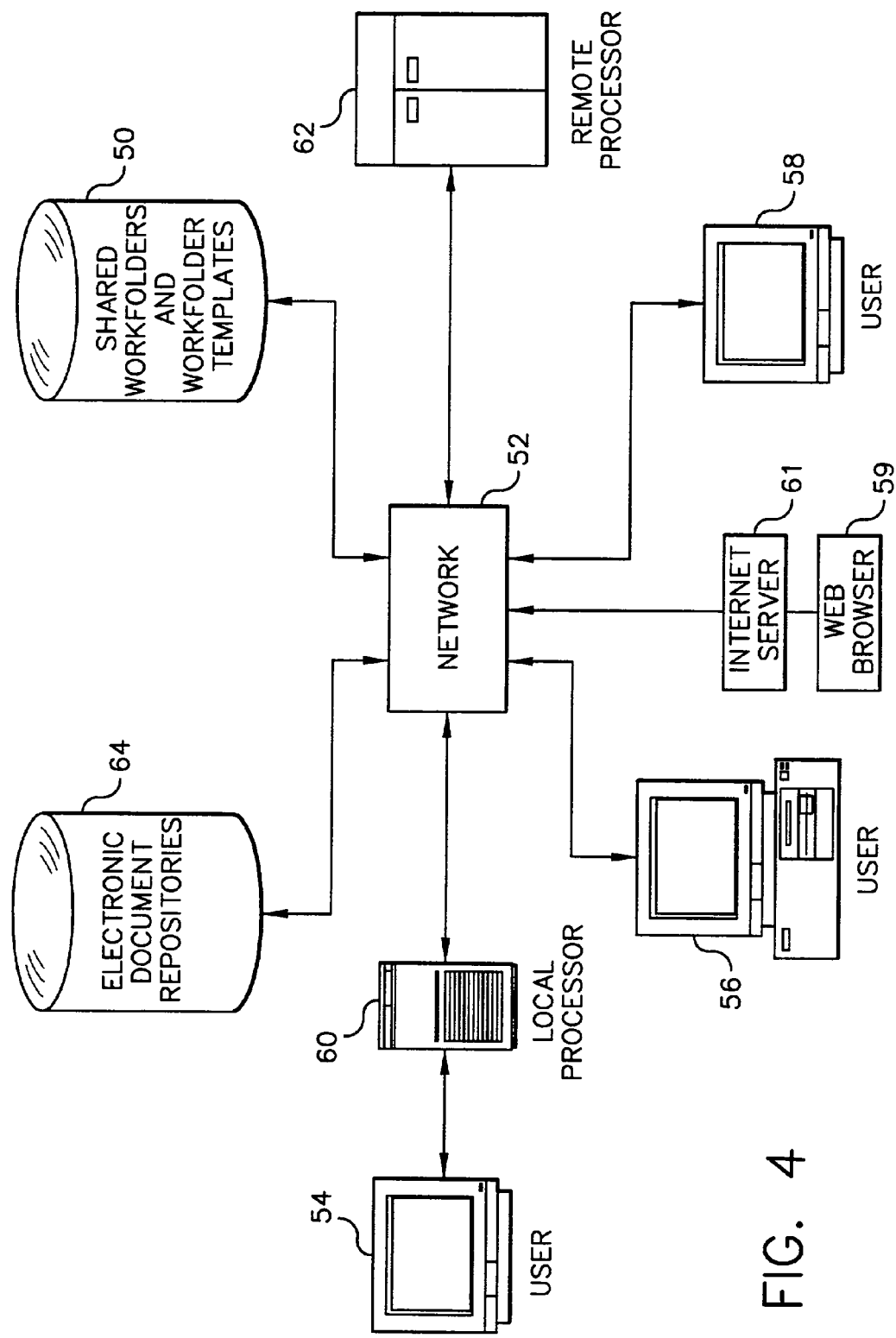
FIG. 4 is a system diagram of a networked computer environment utilizing shared WorkFolders according to the present invention.

A structured WorkFolder environment can be created on a stand-alone computer platform but preferably, the structured WorkFolders and WorkFolder program are implemented on a networked system. FIG. 4 is a basic diagram of a networked computer environment utilizing shared WorkFolders according to the present invention. The WorkFolders and WorkFolder templates are maintained on an electronic storage device 50 connected to a network 52 and thereby to a plurality of users 54-59. A user terminal may be a stand-alone computer (user 56), a terminal connected to a local processor 60 (user 54), a dumb terminal (user 58) which is connected to a remote processor 62, or a "Web-Browser" (user 59) connected to an Internet server 61. Network 52 may also provide access to one or more "external" document repositories 64. It is recognized that the data connections between elements illustrated in FIG. 4 includes both physical connections and remote data links, e.g, through wireless technology such as cellular modems.

Although the WorkFolder storage 50 is shown as a separate shared hardware element, those skilled in the art will recognize that it is immaterial whether this storage element is a physically separate entity or is housed within a local or remote processor connected to the network, or is a distributed storage system. All that is required is that the storage area 50 be accessible to each of the users. It is also recognized that the network 52 may be of any configuration, and in particular may be a conventional LAN, intranet, the Internet, or any combination of different network configurations. The electronic document repository 64 may be one or more of a local document management system, a data archive such as CD- ROM jukebox, or any other accessible data server, such as an Internet server accessible through its URL address.

According to a further aspect of the invention, a WorkFolder environment may be established in a mobile data environment. Thus, it is necessary that one or more users be able to download a WorkFolder to a remote or mobile computer that may later be disconnected from the network and be able to access not only the data within the WorkFolder, but also the contents of remotely linked files According to the present invention, a WorkFolder is initially transferred from a central storage area to a remote storage area using conventional network file transfer protocols. The remote unit is configured to initiate the WorkFolder when it detects that a WorkFolder is being transferred. The WorkFolder program running on the remote unit then extracts all links in the WorkFolder which point to external documents. The WorkFolder then initiates a fetch from the network of some or all of the linked documents. The fetched documents are stored in a designated area on the remote system. The document links in the remote copy of the WorkFolder are then changed so that they point to the fetched files on the remote system and not the files on the network. When the remote user transfers a WorkFolder back to the main system, the process is performed in reverse. Conflict checking may also be performed as required.

In a specifically preferred embodiment, a WorkFolder environment, entitled WFX, containing and supporting one or more WorkFolders operates in a Microsoft Windows 95 or Windows NT 4.0 environment in conjunction with a Microsoft Exchange Messaging infrastructure. The Exchange Messaging infrastructure provides ready support for a multi-user environment, including functions such as shared message repositories known as Public Folders, a globally accessible address book and the ability to send any message to any user in the global address book. The Microsoft Exchange Messaging infrastructure is defined in the Microsoft BackOffice Software Development Kit (SDK), and specifically in the Microsoft Exchange Software Development Kit and the MAPI (industry-standard Messaging API) Software Development Kit, both available from Microsoft Corporation, of Redmond, Washington, USA. Significant supporting documentation is found in technical articles in the Microsoft Developers' Network library. However, all of these functions may also be incorporated directly in the WFX program if required.

Preferably, the hardware environment comprises a high end network server running Microsoft Exchange Server 5.0 or above and one or more client workstations running Microsoft Windows 95 or Microsoft Windows NT 4.0 or above and a Microsoft Exchange or Microsoft Outlook client. The WFX WorkFolder program is written in the C++ programming language, although it is recognized that other programming languages may also be used.

In a specifically preferred embodiment, the WFX program is a MAPI (industry-standard Messaging API) form handler, which is registered in the Exchange environment as the viewing application for a set of MAPI message classes. This registration process consists of the WFX program making conventional MAPI function calls which instruct Exchange from that point onward to always invoke the WFX program when the user attempts to view any message in a certain set of WFX-derived message classes. Once invoked, the WFX program makes additional MAPI function calls to load the actual WorkFolder data, which is stored in a MAPI message on a Microsoft Exchange server. After the user changes or adds various data elements to the WorkFolder and requests to save the WorkFolder, the WFX program makes additional MAPI function calls to write the WorkFolder back as a MAPI message to the Microsoft Exchange server.

There are additional instances where the WFX program interacts with Exchange as the user works with a WorkFolder message. These include the Assignment feature, the Deadline feature, the History export feature, Send and Move To Folder features and the Reconciliation feature, all of which are preferably included in the WFX program, and are discussed below. In all cases mentioned above and below, the WFX program uses conventional MAPI function calls and/or Microsoft Exchange Software Development Kit function calls that are known to programmers skilled in the art.

In this specific embodiment of the invention, WFX has several built in (i.e., predefined) event scripts which increase the functionality of the WorkFolder. An Assignment feature is provided to detect when a placeholder or task has been assigned to a user. In response to this event, an e-mail message is generated and sent to the assignee to inform them of the assignment. A Deadline feature is provided which detects when a WorkFolder deadline is calculated or changed. In response, an e-mail message is generated and then sent to a predefined e-mail address (such as a Microsoft Exchange mailbox). Similarly, when the expiration of a deadline is detected, an e-mail message is generated by the WFX program and sent to one or more predefined users (i.e., the assignee of the expired task or placeholder) informing them of the expiration.

A History export feature may be provided which accumulates the WorkFolder history and formats it for exporting, preferably as an e-mail message which may be sent to a predefined user address. Preferably, the message is formatted such that the accumulated history can then be imported into a database for centralized reporting and statistics gathering.

A Send feature may also be provided to allow one user to deliver a WorkFolder to another user as an e-mail message. The WorkFolder contents may be embedded in the e-mail message or the message may simply include a link to the WorkFolder so that it may be retrieved more easily.

Preferably, these features are implemented using the Microsoft Exchange e-mail subsystem to send e-mail messages of differing content to known mailbox addresses in the Microsoft Exchange global address book. In all cases, conventional MAPI function calls are used to accomplish these features.

The Send to Folder feature allows the user to move the WorkFolder to another location within the Microsoft Exchange message store. This is accomplished through conventional function calls which are detailed in the Microsoft Exchange Software Development Kit.

In a specifically preferred embodiment, WorkFolder templates are implemented as Microsoft Exchange forms which can be stored anywhere in the Microsoft Exchange forms subsystem, including Organization and Personal forms libraries, as well as any folder forms library. Any WorkFolder message can become a WorkFolder template by publishing it as a Microsoft Exchange form in a user-specified forms library using mechanisms implemented in the WFX program. These mechanisms make function calls to the Microsoft Exchange Software, as described in the Development Kit, in order to take the WorkFolder data that currently exists in the WorkFolder message and create a new Microsoft Exchange form that users can use as a template for new WorkFolder messages.

As the form is published to Microsoft Exchange, any WorkFolder Fields that the user marked as "public" become Named Properties in the Microsoft Exchange environment. This is accomplished by supplying these field names and data types to Microsoft Exchange during the course of publishing the form and indicating that they are to be public. Once the form is published and the Fields become Named Properties, they are then searchable by third party applications and can be displayed and used to group, filter and sort WorkFolder messages in the user's Microsoft Exchange client.

The WFX WorkFolder program can also be used to view and edit WorkFolder-based Microsoft Exchange forms directly, in the absence of any WorkFolder message. This is referred to as Template Editing Mode. Rather than loading a WorkFolder message through the mechanism described above, the WFX WorkFolder program makes Microsoft Exchange Software function calls to load a user-specified WorkFolder-based form directly for editing. Once loaded, the save and publish functions available in the WFX program will republish the form to the same or a different location in the Microsoft Exchange forms subsystem, also through the use of Microsoft Exchange Software function calls.

In this specific embodiment, the WFX program formats each WorkFolder as an Exchange message. Therefore, WorkFolders can be placed in an Exchange Public Folder so that multiple users can simultaneously access and work on the same WorkFolder. WFX utilizes the Exchange mail infrastructure to distribute and process work. Thus, a WorkFolder can also be sent directly from one user to another. The fields data elements are made available to third party applications by defining them as Exchange named properties. WorkFolder templates are stored within the Exchange Forms subsystem. Each WorkFolder template is tagged with application data that instructs Exchange to call the WFX program when the user creates a document using a WorkFolder template.

In the preferred embodiment of the invention, the Reconciliation feature described above has a server-side implementation and a client-side implementation. Both components use a combination of Microsoft Exchange Software function calls and MAPI function calls in order to (1) detect that a WorkFolder message has generated an Exchange conflict message, (2) extract and present conflict information to a user, and (3) resolve the conflict. Since the WorkFolder will preferably reconcile conflicts, it is necessary to override the standard Microsoft Exchange conflict handling mechanisms. This may be easily accomplished using standard features of the Microsoft Exchange and MAPI Software Development Kits which will be apparent to those of skill in the art.

The specifically preferred embodiment will be discussed with respect to FIGS. 5-14 which show various computer screen displays that are generated by the WFX program. In general, the WFX program presents the WorkFolder information to the user through a conventional Microsoft Windows GUI protocol with pull-down menus and tool bars. A WorkFolder may be created and edited using standard commands such as insert, delete, copy, cut, and paste.

The preferred embodiment supports an undo operation that allows a user to correct erroneous changes to the WorkFolder. Undo functions are well known in the art. It should be noted, however, that when a modification of a WorkFolder is undone, the history log within that WorkFolder must also be updated to remove reference to the undone modification. Preferably, only one level of undo functionality is supported, however more than one level may be provided with increased coding complexity.

Figure 5:
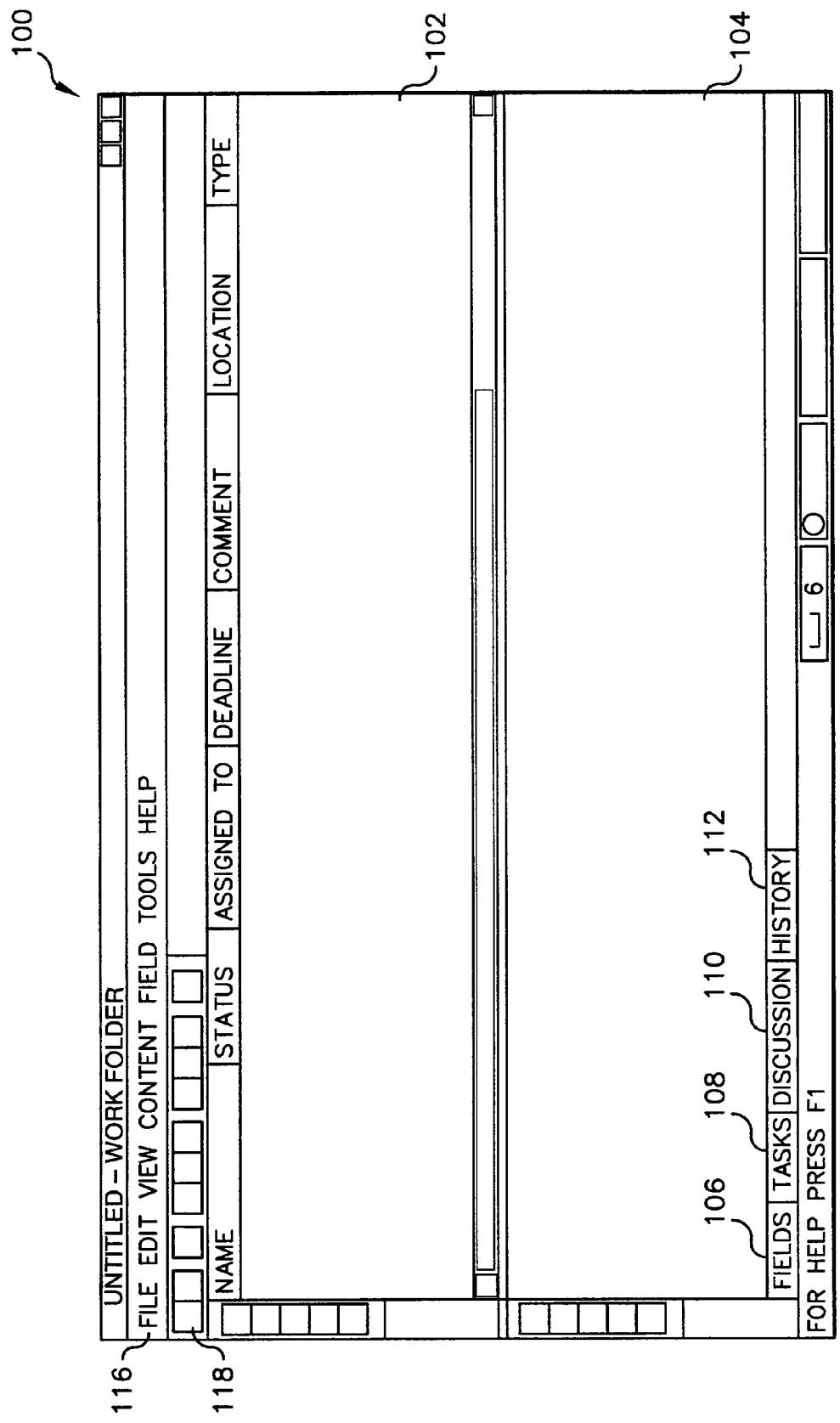
FIG. 5 is an illustration of the basic WorkFolder program processing screen according to a preferred embodiment of the invention.

FIG. 5 is an illustration of the basic WFX WorkFolder processing screen 100. The screen is comprised of an upper contents pane 102 and a lower tabs pane 104. The contents pane 102 is used to organize and present the structure and data stored under the contents node 12 of a specific WorkFolder object 10. In FIG. 5, no WorkFolder data has been defined and thus the contents pane 102 is empty.

The tabs pane 104 is used to present information which is stored in the fields 20, tasks 14, discussion 16, and history 18 data objects stored in the WorkFolder 10. The contents of each data object 14-20 is accessed by selecting the appropriate fields, tasks, discussion, or history tab 106-112. In addition, the basic WorkFolder screen 100 has conventional pull-down menu items 116 and icon-driven toolbars 118. Data objects such as documents 28, sections 26, and placeholders 24 may be added by the user through appropriate "insert" or "new object" commands selected from the menu system or via a sequence of mouse clicks.

Figure 6:
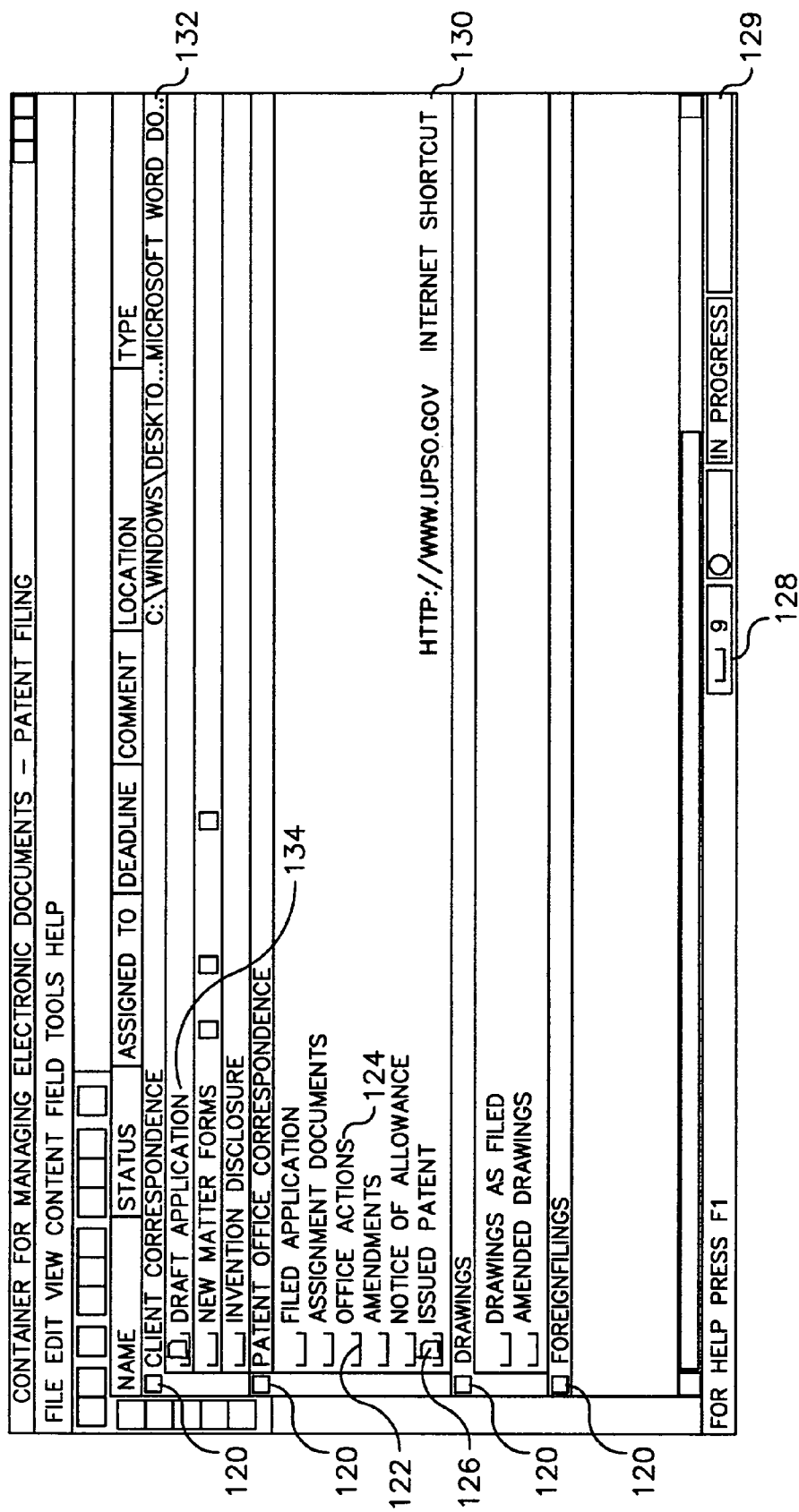
FIG. 6 is a program screen according to a preferred embodiment of the invention with a WorkFolder that is configured to organize patent application work items.

FIG. 6 is an illustration of a WorkFolder 10 which is configured to organize patent application work items. Note that the contents pane 102 has been expanded to fill the screen. The WorkFolder 10 has been configured to have several sections 26. These sections are represented as windows 120 within the contents pane 102. The name of each section window 120 corresponds to the name of the section 26. In this example, the WorkFolder is divided into sections for client correspondence, Patent Office correspondence, Drawings, and Foreign filings.

Within each section 120 are a number of placeholders 24. Empty placeholders are represented as empty trays 122 next to the placeholder name 124. Filled placeholders 24 are represented as a tray containing an icon 126 representing the document type which has been stored in the placeholder 24 or to which the placeholder points. A user can fill a placeholder by selecting the appropriate placeholder and indicating the appropriate document to add, e.g., by typing the document address, selecting the document from a file manager application, or via cut-and-paste. When a placeholder is filled, the appropriate icon image is extracted by the operating system through conventional means. In addition, the document location and document type information is provided in a status line, i.e., 130, 132, following the placeholder name.

In this example, placeholder 126 contains a URL link to an external Internet document and placeholder 134 contains a pointer to a Microsoft word document located on the user's "C" drive. The number of unfilled Placeholders 128 is indicated in a status line 129 at the bottom of the WorkFolder window 100.

Thus, according to one aspect of the invention, the WFX program provides a visual distinction between unfilled placeholders, filled placeholders, and documents not in a placeholder, which are represented as icons unconnected to a placeholder "basket." (not shown). A visual distinction between WorkFolder elements imported from a template and "customized" elements is also provided by representing these items in different colors.

Figure 7:
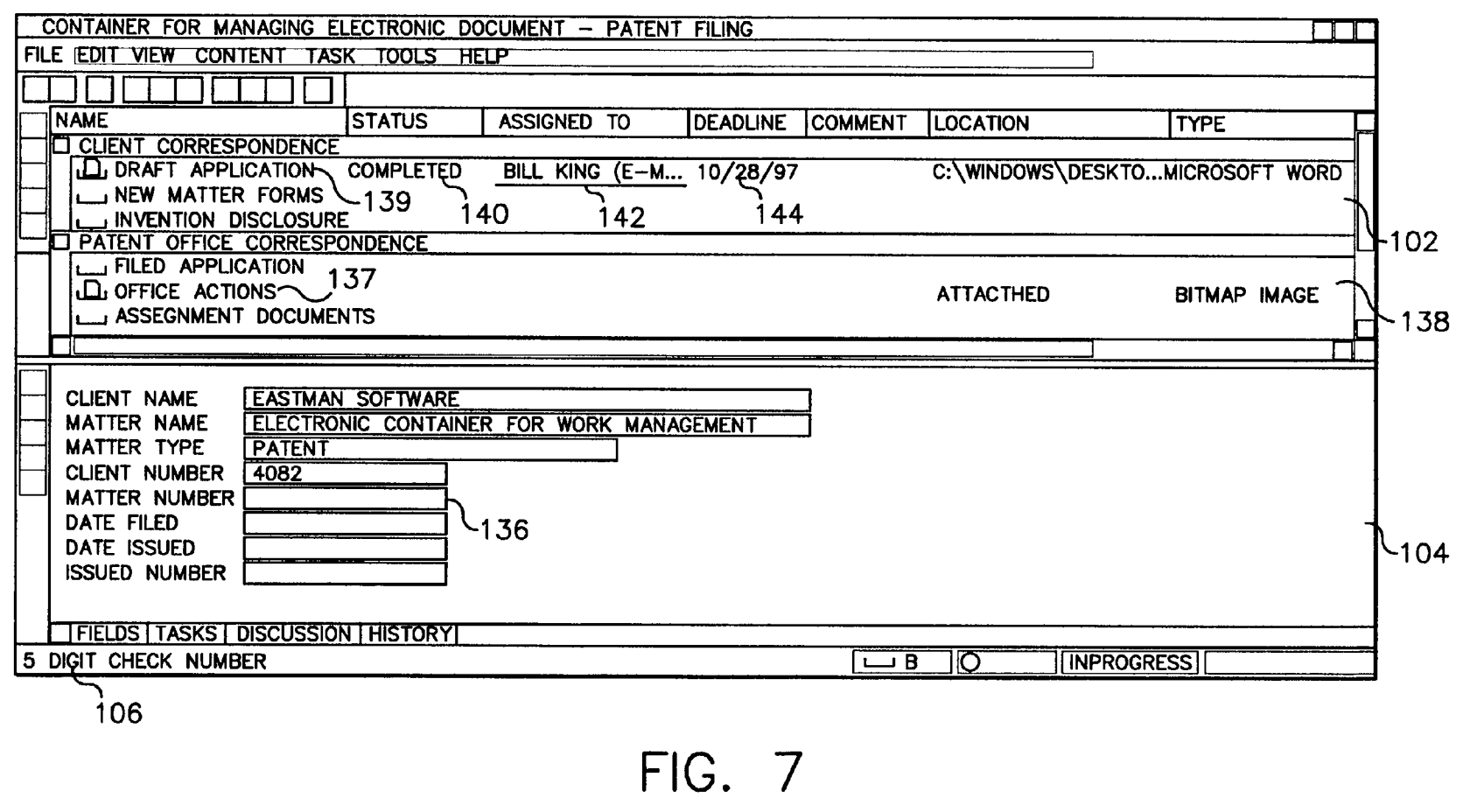

FIG. 7 is an illustration of the tabs pane 104 with the fields tab 106 selected. As discussed above, the field element 20 contains conventional forms processing data elements 136 which are defined via a conventional forms processor. Fields can be inserted, deleted, reordered, and assigned various properties. In this example, the fields are used to define information about the client and the patent filing and issue dates and the serial number.

In addition, FIG. 7 shows that placeholder 137 has been filed with an attached bitmap image as indicated in the status line 138. Further, the status line for the "Draft Application" placeholder 139 indicates the placeholder status 140 (here "completed"), that the placeholder has been assigned to a user 142, and the deadline for filling the placeholder 144.

FIG. 8 is an illustration of the tabs pane 104 with the tasks tab 108 selected. In FIG. 8, two tasks 148, 150 have been defined. Tasks can be defined and updated using conventional input mechanisms such as pop-up dialog boxes. In this example, both tasks have a status of "not started." Task 148 ("Prepare Application") has an absolute deadline. In contrast, task 150 ("File Application") has a relative deadline which is dependent on the completion date of the Prepare Application task 148. A task is visually represented by a unique task icon 152.

Figure 9:
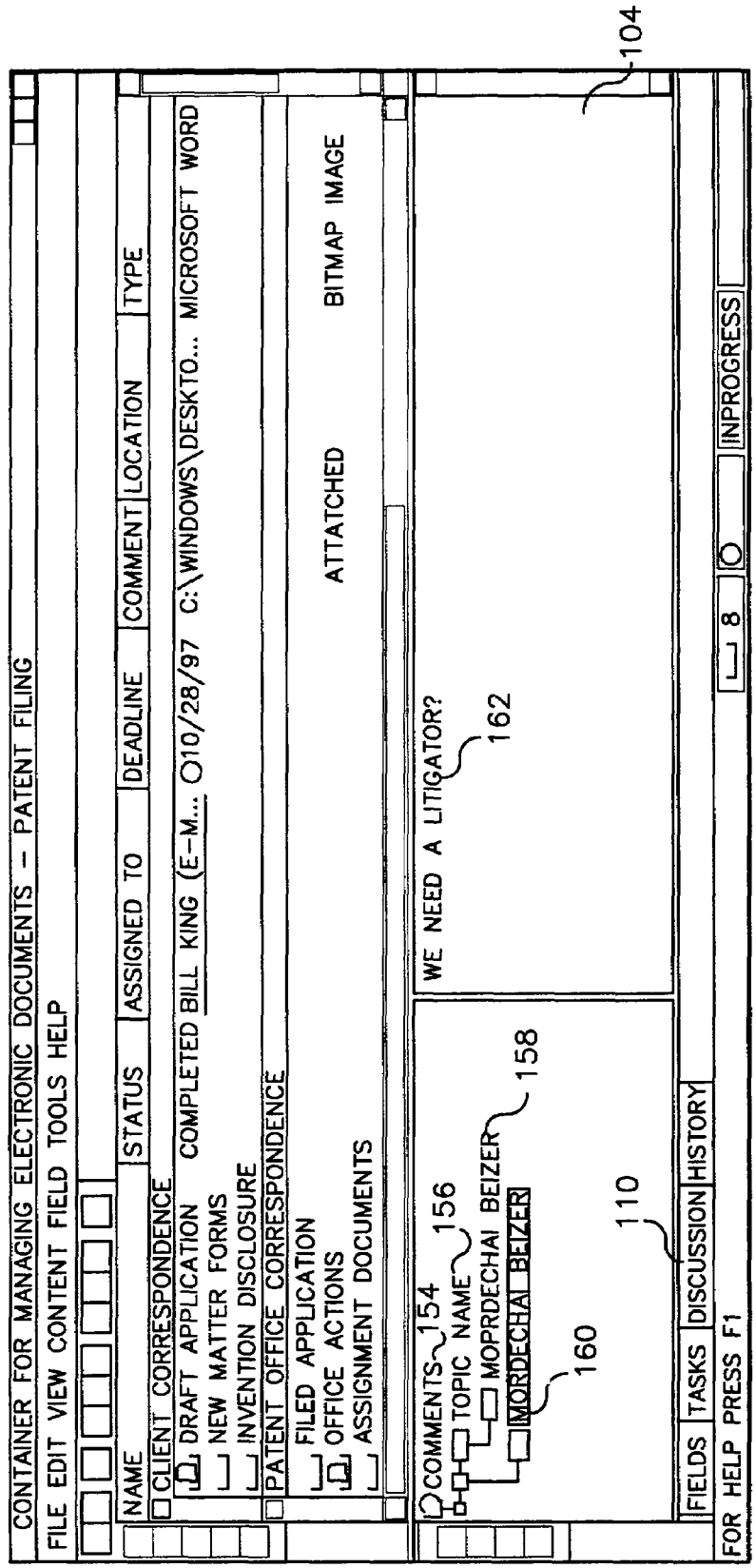
FIG. 9 is a program screen according to a preferred embodiment of the invention showing the tabs pane with the discussion tab selected.

FIG. 9 is an illustration of the tabs pane 104 with the discussion tab 110 selected. Each comment 156, 158 is stored under an appropriate named topic folder 154. The comments are represented as a threaded discussion so that replies to comments 158 are linked to the original comment 156. When a comment title is selected 160, the text of the comment 162 is displayed in a comment window.

Figure 10:
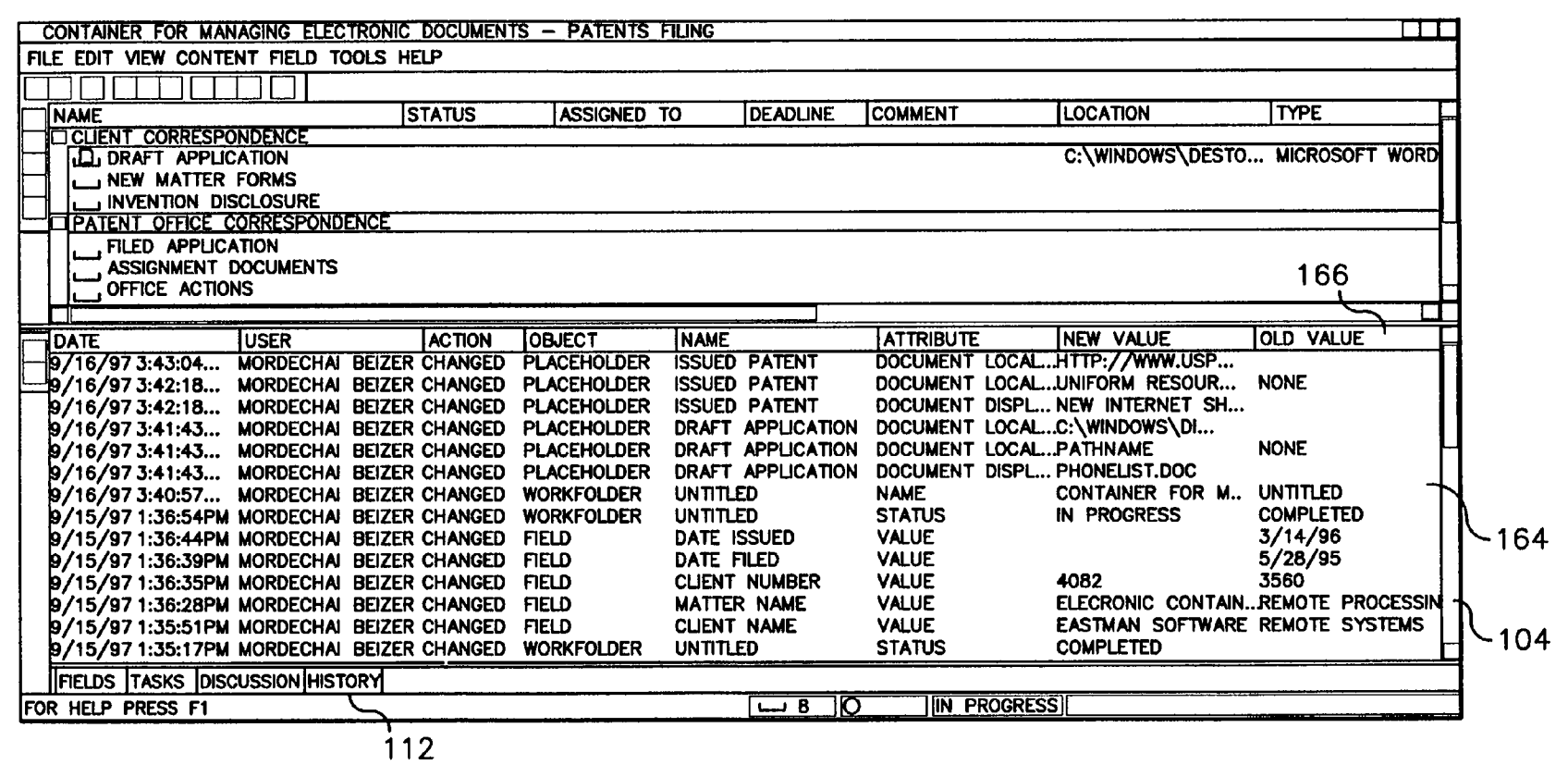

FIG. 10 is an illustration of the tabs pane 104 with the history tab 112 selected. As discussed above, each change to the structure of a WorkFolder 10 is recorded in the History data element 18. When the history tab 112 is selected, the history log 164 is displayed. The history data for each element in the log 164 is displayed in columns corresponding to the column header bar 166. All the attributes of a modification, including who made the modification and when, what was changed, as well as the old and new values can be displayed. In addition to displaying the full history log, the user may extract history related to a particular WorkFolder element, such as a section or placeholder, by selecting that item and using the history function.

Figure 11:
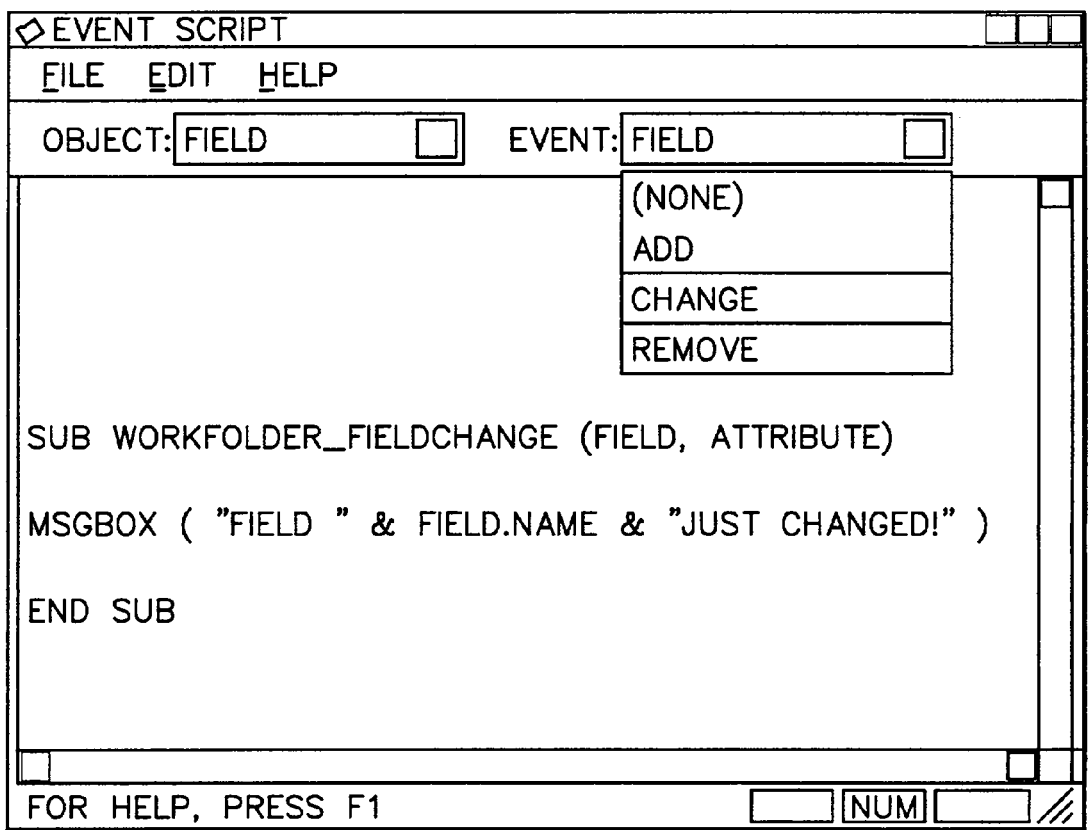
FIG. 11 is a program screen according to a preferred embodiment of the invention showing an Event script editor.
Figure 12:
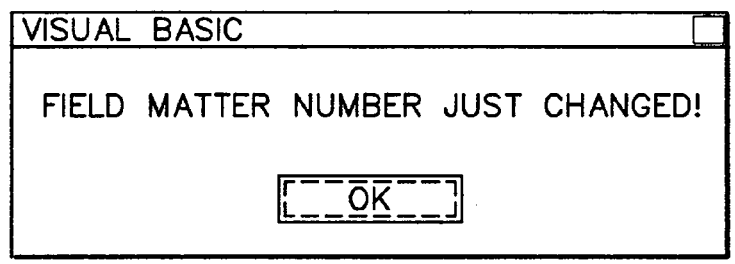
FIG. 12 is a program screen illustrating the result of executing the script shown in FIG. 11.

FIG. 11 is an illustration of an Event script editor 168. Event scripts may be edited using a conventional text editor. Alternately, specialized applications for writing scripts in scripting languages such as Visual Basic Script and Java Script may be utilized. This simple example script is written in Visual Basic and will send a message in response to a WorkFolder event triggered by the changing of data in a field. When the script is stored in the Scripts data element 22, the WorkFolder script processor, in conjunction with the Event handler, monitors the selected event. When the event occurs, the script is executed automatically as discussed above. FIG. 12 shows the result of executing the script of FIG. 11.

Figure 13:
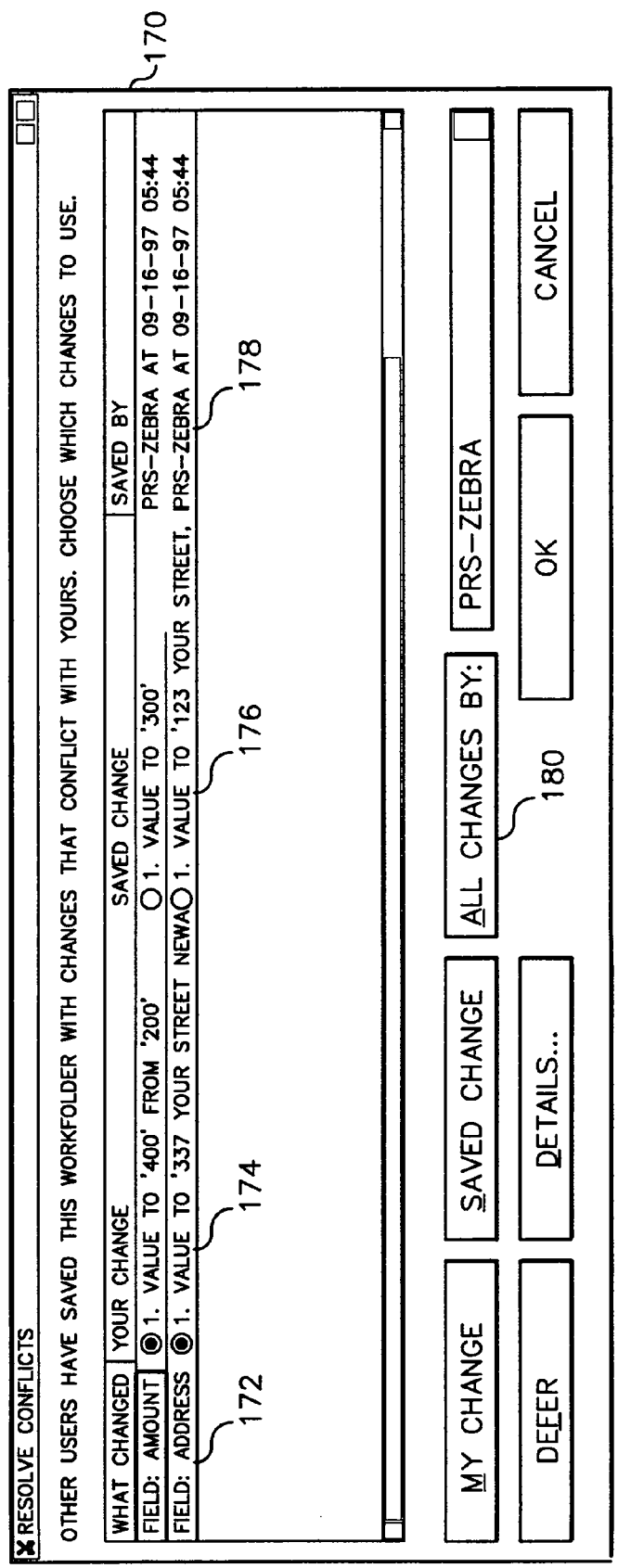
FIG. 13 is a conflict mediation dialog box according to a preferred embodiment of the invention.

FIG. 13 is an illustration of a conflict mediation dialog box 170 which is presented to a user during a conflict reconciliation procedure. According to a further aspect of the invention, the WorkFolder program preferably does not require locking mechanisms to prevent data conflicts when two or more uses update the contents of a WorkFolder concurrently. According to this aspect of the invention, when two users make concurrent changes to a WorkFolder and then save, the changes are analyzed to determine whether they are directly in conflict, or whether the changes can be merged. For example, if user 1 adds a document to a placeholder, while user 2 enters data into an unrelated Address field, the changes are not in conflict and therefore can be merged. When a WorkFolder is saved and a conflict with another's user's changes is detected, i.e., user 1 and user 2 added different documents to the same placeholder, the user whose changes created the conflict (typically the second user to save an updated WorkFolder) is presented with conflict resolution data so that the conflict may be resolved. In this example, the user's changes created two conflicts. As shown, the conflict dialog box 170 indicates the data element that changed 172, the change that was made by the user 174, the conflicting change entered by a previous user 176 and their ID 178. Given this information, the user can then resolve the conflict by selection which of the two values to preserve. The selection can be done individually, or the user can indicate that all changes by a given ID be preserved by, e.g., pressing the appropriate function button 180.

Alternatively, conflict mediation can be deferred. This deferred conflict reconciliation is preferably implemented when WorkFolders are automatically replicated across various mirror sites in a networked environment. In this environment, conflicts may be detected during replication, when the affected users are not available to participate in an immediate conflict mediation dialog. In this situation, the conflicting items are saved as alternate sub-items and identified as being in conflict. When the WorkFolder is accessed, the items in conflict are identified so that the user may select which change to preserve.

FIG. 14 is a screen display showing conflicting sub-items generated when a conflict requiring mediation occurs but mediation is not performed (i.e., during unattended reconciliation). When a WorkFolder with a conflict element is viewed, both versions of the conflicting element are presented as sub-elements 184, 186 under a conflict heading 182. In this example, a conflict was created when one user defined the status of the Invention Disclosure placeholder as started while a second user defined the status as not started. The conflict is resolved when a user with the proper authority selects which of the two sub-items 184, 186 to preserve.

The invention has been described in detail with particular reference to certain preferred embodiments thereof, but it will be understood that variations and modifications can be effected within the spirit and scope of the invention.

What is claimed is:

1. A computer readable memory having a plurality of storage locations for storing records in the computer readable memory, said memory comprising:

a structured workfolder for storing and organizing electronic documents which each of said documents will exist or will not exist at the time of workfolder creation, the structured workfolder hem created by a template and being a root node; and a contents node in the root node of the structured workfolder, the contents node serving as a base to which elements of the workfolder are linked, the contents node storing primary elements data including document contents as embedded file data, the document contents being of existing primary element documents, said contents node containing one or more placeholders within said workfolder, each placeholder being a slot that has been reserved for new documents to be added to said workfolder via said placeholder, and each placeholder structurally including (i) a file object hook to which a primary element document can later be linked and (ii) a deadline element having a triggering condition field for storing a triggering event and an indicated time period relative to the occurrence of said triggering event.

2. The memory of claim 1, wherein said contents node further contains one or more section elements for categorizing said primary data.

3. The memory of claim 2, wherein said section elements contains one or more of a placeholder, a link to a document, and a nested section element.

4. The memory of claim 3, wherein said link identifies a document embedded in said workfolder.

5. The memory of claim 3, wherein said link identifies a document external to said workfolder.

6. The memory of claim 1, wherein said contents node further contains at least one link to a document.

7. The memory of claim 6, wherein said link identifies a document embedded in said workfolder.

8. The memory of claim 6, wherein said link identifies a document external to said workfolder.

9. The memory of claim 1, wherein said placeholder further comprises a name field for indicating the data content of the document to be placed in the workfolder.

10. The memory of claim 1, wherein said placeholder further comprises a field containing limits on at least one of the file name and file type of a primary data document which can be linked to said placeholder.

11. The memory of claim 1, wherein said placeholder further comprises a status element indicating a status for a document linked to said placeholder.

12. The memory of claim 1, wherein said placeholder further comprises an assignment field indicating one or more users responsible for filling said placeholder.

13. The memory of claim 1, wherein the deadline element further includes a field indicating the time period for taking a particular action associated with said placeholder.

14. The memory of claim 1, wherein said placeholder further comprises a comment element for storing information related to said placeholder.

15. The memory of claim 1, wherein said placeholder further comprises a position indicator indicating a position of said placeholder relative to a plurality of other placeholders contained in said contents node.

16. The memory of claim 1, wherein said placeholder further comprises a unique identifier.

17. The memory of claim 1, wherein said workfolder further comprises a tasks data element containing one or more tasks which define a set of steps required to complete a unit of work, each said task having a name field indicating a particular task to be performed and a status field indicating the status of said task.

18. The memory of claim 17, wherein said task element further comprises an assignment field for indicating one or more users responsible for performing said particular task.

19. The memory of claim 17, wherein said task element further comprises a task deadline element including a field for indicating a time period for performing said particular task.

20. The memory of claim 19, wherein said task deadline element further comprises a triggering condition field for storing a task triggering event and said indicated time period for performing the particular task is relative to the occurrence of said task triggering event.

21. The memory of claim 1, wherein said workfolder further comprises meta-data related to the primary data stored under said contents node.

22. The memory of claim 21, wherein said meta-data comprises a history element for storing a log of changes made to said workfolder.

23. The memory of claim 22, wherein for each one of said changes made to said workfolder, said log contains data fields for including information indicating at least one of when the change was made, who made the change, what type of change was made, and the value/structure of the changed portion of the workfolder before and after the change.

24. The memory of claim 21, wherein said meta-data comprises a fields element for containing user-definable data fields relating to one or more properties of said workfolder.

25. The memory of claim 21, wherein said meta-data comprises a discussion element for containing user communications related to said work folder contents.

26. The memory of claim 21, wherein said meta-data comprises a script element for including one or more embedded computer program scripts which provide functions related to said workfolder when said scripts are executed by a computer.

27. A computer readable memory having a plurality of storage locations for storing records in the computer readable memory, said memory comprising:

a template used to create one or more structured workfolders for storing and organizing electronic documents, each structured workfolder being a root node;

for each structured workfolder, said template containing a contents node in the structured workfolder root node for storing primary elements data including embedded file data for document contents of existing primary element documents, the contents node serving as a base to which elements of the workfolder are linked; and said contents node containing a placeholder within said workfolder, the placeholder being a slot that has been reserved for new documents to be linked to said workfolder, which said documents will exist or will not exist at the time of workfolder creation, said documents being linkable subsequent to their creation to said workfolder via said placeholder in said workfolder, and the placeholder structurally including (i) a file object hook to which a primary element document can later be linked and (ii) a deadline element having a triggering condition field for storing a triggering event and an indicated time period relative to the occurrence of said triggering event.

28. The memory of claim 27, wherein said template further comprises a tasks data element for containing one or more tasks which define a set of steps required to complete a unit of work associated with said workfolder, each said task having a name field for indicating a particular task to be performed and a status field for indicating the status of said task.

29. The memory of claim 27, wherein said contents node in said template further contains one or more section elements for categorizing data stored in said workfolder, each said section element having a name indicating its contents.

30. The memory of claim 27, wherein said template further comprises meta-data related to said template.

31. The memory of claim 30, wherein said meta-data comprises a history element for storing a log of changes made to said workfolder template.

32. The memory of claim 31, wherein for each of said changes made to said workfolder, said log contains data fields for including information indicating at least one of when the change was made, who made the change, what type of change was made, and the value/structure of the changed portion of the workfolder template before and after the change.

33. The memory of claim 30, wherein said meta-data comprises a discussion clement for containing user communications related to said workfolder template.

34. The memory of claim 27, wherein said template further comprises a script element including one or more embedded computer program scripts which provide functions related to said workfolder when said scripts are executed by a computer.

35. The memory of claim 27, wherein said template further comprises a fields element containing form data fields relating to one or more properties relevant to said workfolder.

36. A method of creating in a computer readable memory a structured workfolder for organizing electronic documents comprising the steps of:

using a template, creating a structured workfolder root node, said root node containing a contents node for storing primary elements data including embedded file data for document contents of existing primary element documents, the contents node serving as a base to which elements of the workfolder are linked; and creating at least one placeholder within said workfolder, the placeholder being a slot that has been reserved for new documents which will exist or will not exist at the time of workfolder creation and are linked to said workfolder via said placeholder, and the placeholder structurally including (i) a file object hook to which a primary element document can later be linked and (ii) a deadline element having a triggering condition field for storing a triggering event and an indicated time period relative to the occurrence of said triggering event.

37. The method of claim 36, further comprising the step of creating one or more section elements under said contents node for categorizing said primary data, each said section element having a name indicating its intended contents.

38. The method of claim 37, further comprising the step of associating said at least one placeholder with one of said section elements.

39. The method of claim 38, further comprising the step of creating one or more of a placeholder element, a link to a document, and a nested section element under said section element.

40. The method of claim 36, further comprising the steps of embedding the contents of a document in said workfolder and linking to said embedded document via said placeholder.

41. The method of claim 36, further comprising the step of linking said workfolder to an external document via said placeholder.

42. The method of claim 36, wherein the step of creating said at least one placeholder further comprises the step of providing a name for said placeholder to indicate the data content of a document to be placed in said workfolder.

43. The method of claim 36, further comprising the step of providing limits on at least one of the file name and file type of a document which can be linked to said placeholder.

44. The method of claim 36, further comprising the step of creating a status element under said placeholder for indicating a status of work associated with creating a document to link to said placeholder.

45. The method of claim 36, further comprising the step of creating an assignment element associated with said placeholder for indicating one or more users responsible for linking an appropriate document to said placeholder.

46. The method of claim 36, wherein the step of creating said at least one placeholder including the deadline element further includes creating a field indicating the time period for taking a particular action associated with said placeholder.

47. The method of claim 36, further comprising the step of creating a comment clement for storing information related to said placehoider.

48. The method of claim 36, further comprising the step of providing each of said placeholders with a position indicator indicating a position of said placeholder relative to other placeholders contained in said workfolder.

49. The method of claim 36, further comprising the step of providing said placeholder with a unique identifier.

50. The method of claim 36, further comprising the step of creating a tasks data element for containing one or more tasks which defining a set of steps required to complete a unit of work, said tasks data element having, for each contained task, a name field for indicating a particular task to be performed and a status field for indicating the status of said task.

51. The method of claim 50, further comprising the step of creating an assignment field for a particular task contained in said tasks data element, said assignment field indicating one or more users responsible for performing said particular task.

52. The method of claim 50, further comprising the step of providing a task deadline element associated with a particular task contained in said tasks data element, said task deadline element including a field for indicating a time period for performing said particular task.

53. The method of claim 36, further comprising the step of creating a meta-data element in said workfolder for storing meta-data related to the primary data stored under said contents node.

54. The method of claim 53, further comprising the step of creating a history data element associated with said meta-data element for storing a log of changes made to said workfolder.

55. The method of claim 53, further comprising the step of creating a fields element associated with said workfolder for containing user-definable data fields relating to one or more properties of said workfolder.

56. The method of claim 53, further comprising the step of creating a discussion element associated with said workfolder for containing user communications related to said workfolder contents.

57. The method of claim 53, further comprising the step of creating a script element associated with said workfolder for including one or more embedded computer program scripts which provide functions related to said workfolder when said scripts are executed by a computer.

* * * * *